Jan. 31, 1933. J. J. PREBLE 1,895,642

FILTER UNIT

Filed Dec. 26, 1925  2 Sheets-Sheet 1

Inventor
James Jarvis Preble
by Charles W. McDermott
his attorney

Jan. 31, 1933.   J. J. PREBLE   1,895,642
FILTER UNIT
Filed Dec. 26, 1925   2 Sheets-Sheet 2

Patented Jan. 31, 1933

1,895,642

UNITED STATES PATENT OFFICE

JAMES JARVIS PREBLE, OF NEWTON, MASSACHUSETTS; LIVINGSTON STEBBINS, ADMINISTRATOR OF SAID JAMES JARVIS PREBLE, DECEASED, ASSIGNOR, BY MESNE ASSIGNMENTS, TO AMERICAN AIR FILTER COMPANY, OF LOUISVILLE, KENTUCKY, A CORPORATION OF DELAWARE

FILTER UNIT

Application filed December 26, 1925. Serial No. 77,679.

The present invention relates to air filters which are used in removing bacteria and in eliminating or recovering the small, solid particles called dust, floating in a gas, such as atmospheric air, or a gas produced in a manufacturing process.

The object of the present invention is to provide a filter unit with a simplified and improved construction whereby a great saving is made in the cost of manufacture and whereby a highly efficient filter is obtained.

To the accomplishment of this object, and such others as may hereinafter appear, the features of the invention relate to certain devices, combinations and arrangements of parts fully set forth hereinafter, the advantages of which will be readily understood by those skilled in the art.

The various features of the invention will be best understood from an inspection of the accompanying drawings illustrating one embodiment of the invention, in which, Figure 1 is a detail plan of a coarse expanded metal sheet;

It will be apparent to those skilled in the art that no drawing could adequately illustrate the filtering media of the present invention. For the purpose of disclosure it is considered sufficient to illustrate the kind of expanded metal sheets and copper fabric screens comprising the filtering media and the heavy and light dust accumulators and then to illustrate in a diagrammatic manner how these sheets are assembled to form the complete contents of the filter cell.

Figure 12:
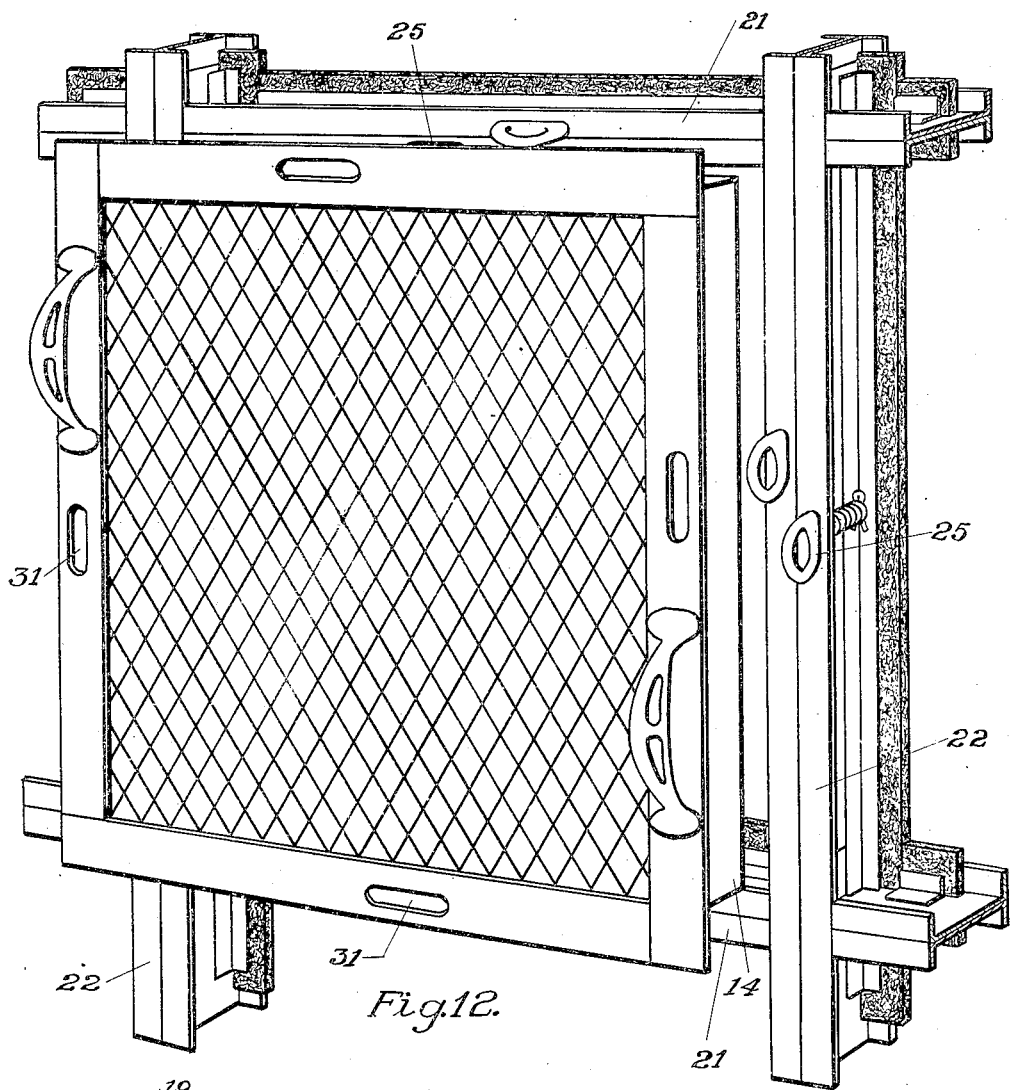
Fig. 12 is a detail in perspective showing the filter unit cell and the frame therefor.
Figure 13:
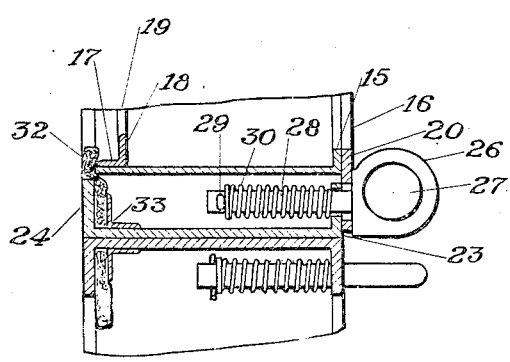
Fig. 13 is a sectional detail showing the means for securing the filter cell to the frame.

Referring first to Figs. 12 and 13 the filter unit cell comprises a heavy gauge steel box 14 having an inturned flange 15 providing an inlet opening 16. Welded within the open rear end of the box 14 is a back 17 having an inturned flange 18 providing an outlet opening 19. The box carries a rectangular flange 20 the inner edges of which are flush with the edges of the inlet opening 16 and the outer edges of which project beyond the sides of the box 14. The surrounding frame for the filter unit cell is formed by welding two I cross-beams 21 to two I columns or vertical beams 22. This forms a rectangular opening having a front flange 23 and a rear flange 24. It should be understood that this opening for the filter cell constitutes one of a bank of openings for holding a plurality of filter cells.

The filter cell is secured in place within its particular surrounding frame by four spring latches 25 (Fig. 12) two of which are carried by the front flanges 23 on the vertical beams and two of which are carried by the front flanges 23 on the cross-beams. Each latch comprises a head 26 having a finger opening 27, and a shank 28. Coiled around the shank 28 and interposed between the rear faces on the front flanges 23 of the beams and a pin 29 on the shank 28, is a spring 30. The flange 20 on each filter unit is provided with four elongated slots 31 which loosely fit over the heads 26 when the filter cell is placed in position within the rectangular opening. By inserting a finger into the opening 27 the head 26 may be drawn through the slot 31 thus tensioning the spring 30. A quarter turn is then given the head 26 which is released to cause it to engage the flange 20 and permit the tensioned spring 30 to pull the flange 20 tightly against the external faces of the front flanges 23 on the beams.

In order to provide an air-tight joint between the rear corner edges of the box 14 and the adjacent internal faces of the rear flanges 24 of the beams, the beams carry a strip of felting 32 interposed between said faces and a bracket strip 33 secured to the beams. The felting 32 is wider than the width of the rear flanges 24 so that when the filter cell is inserted in place the rear corner edges of the box 14 engage the loose part of the felting 32 and compress it against the edge face of the rear flange 24 thus to form an air-tight joint between the box and the rear flanges 24.

The main filtering media within the filter cell comprises a stack 34 (Fig. 11) of viscous-coated diversiform expanded metal sheets each of which is arranged in a plane normal to the inlet opening 16. Stated in another way, the end faces of the sheets on one side of the stack 34 are directed toward the inlet opening. While the number of sheets in the stack 34 may vary to meet varying operating conditions it has been found that with a stack composed of 150 sheets (18" x 2.4") excellent results are obtained.

Preferably the stack 34 is composed of 75 double-mesh herringbone expanded metal sheets 35 (Figs. 5 and 6) and 75 corrugated expanded metal sheets 36 (Figs. 7 and 8) alternately arranged throughout the stack. Referring to Figs. 5, 6, 7 and 8 it will be apparent that the various strands of the double-mesh herringbone and corrugated sheets are bent in many directions. The air in passing through the stack from one end face to the opposite end face thereof has its direction suddenly and repeatedly changed by these strands. The air in addition to encountering the strands passes in a zig-zag or undulating manner through the openings in the sheets from one face thereof to the opposite face. The air is thus exposed to an enormous aggregate area of sticky surface which removes practically all the dust from the air.

Figures 1, 2:
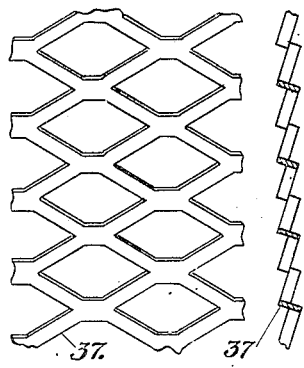
Fig. 2 is a vertical sectional elevation thereof.

The stack 34 may take up the entire space between the inlet and outlet openings in the filter cell. It is preferred, however, to interpose between the stack and the inlet opening 16 a heavy dust accumulator comprising a series of four viscous-coated expanded metal sheets arranged in planes parallel to the plane of the inlet opening. This heavy dust accumulator, which also may be termed a laminated cover for the inlet opening 16, removes the larger particles of dust from the air thus relieving the stack of this duty and accordingly reducing the liability of the stack to clog. The first sheet of the heavy dust accumulator is a sheet of coarse expanded metal 37 (Figs. 1 and 2) arranged against the internal face of the flange 15 with the long way of the mesh running substantially vertical.

Figures 3, 4:
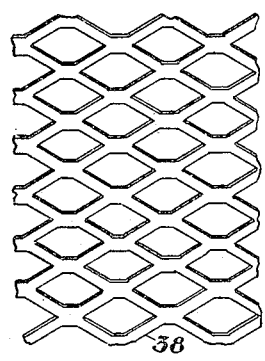
Fig. 3 is a detail plan of a finer expanded metal sheet.
Fig. 4 is a vertical sectional elevation thereof.
Figures 5, 6:
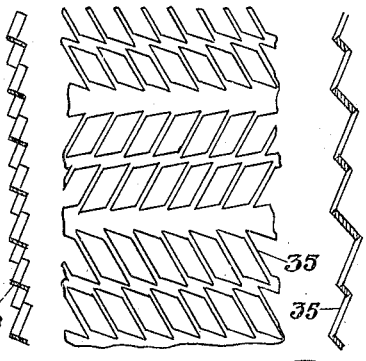
Fig. 5 is a detail plan of a double-mesh herringbone expanded metal sheet.
Fig. 6 is a vertical sectional elevation thereof.
Figures 7, 8:
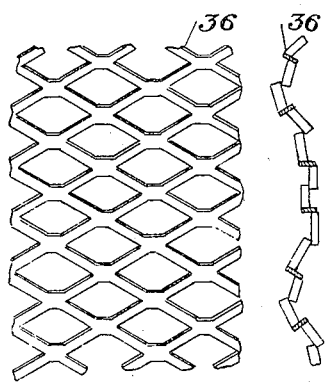
Fig. 7 is a detail plan of a corrugated expanded metal sheet.
Fig. 8 is a vertical sectional elevational thereof.

The next sheet is a sheet of finer expanded metal 38 (Figs. 3 and 4) arranged with the long way of the mesh running substantially horizontal. The next two sheets are the sheets 38 arranged with the long way of the mesh running substantially vertical and horizontal, respectively.

Figures 9, 10:
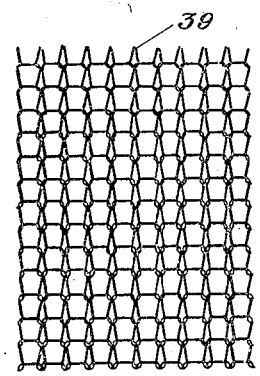
Fig. 9 is a detail plan of a copper mesh tubular fabric screen.
Fig. 10 is a vertical sectional elevation thereof.

Interposed between the stack 34 and the outlet opening 19 is a light dust accumulator comprising a series of eleven viscous-coated sheets, one of which is the sheet 37 and the rest of which are five pieces of the tubular copper mesh fabric 39 (Figs. 9 and 10). The ten sheets of copper mesh are held in place by crimping the edges of the sheet 37 over the assembled pieces of the copper fabric. This light dust accumulator, which also may be termed a laminated cover for the outlet opening 19, removes any fine particles of dust which may have passed through the stack or which, having been eliminated by the stack, work loose and are blown off the stack by the air passing therethrough. By interposing the five pieces of tubular copper mesh fabric between the stack 34 and the outlet sheet 37 of expanded metal the depth of the filtering media is increased in the direction of air flow thus materially increasing the total surface area of the filtering media. The copper fabric furthermore is permanent not being eroded by rust.

Figure 11:
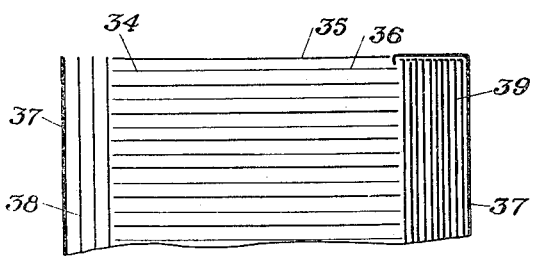
Fig. 11 is a diagrammatic right side elevation showing the arrangement of the parts comprising the filtering media.

Referring to Fig. 11 the dust-laden air enters the filter cell through the inlet opening and passes through the openings in the heavy dust accumulator which eliminates or recovers the heavier particles of dust. The air next impinges against the end faces of the stack which forcibly splits the air into a large number of sub-currents which find their way through the stack being turned suddenly in a number of different directions by the strands of the expanded metal sheets. Most of the remaining particles of dust are eliminated or recovered in the stack. After leaving the stack the air passes through the light dust accumulator which eliminates or recovers practically all the dust remaining in the air.

The unit cell is filled with the filtering media before the back 17 is welded in position. The coarse sheet 37 is first inserted within the box and placed against the flange 15. The sheet 37 is then backed by the three sheets 38. The stack 34 is built up outside the box, the sheets comprising the stack being clamped or bound in place to facilitate insertion of the stack within the box and against the last sheet 38. After insertion within the box 14 the clamp or binder for the stack is removed and the light dust collector or laminated cover for the opening is inserted into the box. The light dust accumulator is assembled outside the box and inserted against the stack 34 with the coarse sheet of expanded metal 37 directed away from the stack 34. Finally the back 17 is pushed against the sheet 37 and welded in place to the box 14. The filter cell is then dipped into a tank containing a viscous fluid having a strong affinity for dust in order to coat all the surfaces of the filtering media with means for retaining the dust thrown from the air by the sudden and repeated changes in the direction thereof caused by the construction and arrangement of the filtering media.

Nothing herein explained is to be interpreted as limiting the invention in the scope of its application to use in connection with the particular apparatus or the particular mode of operation or both selected for purposes of illustration and explanation. While the particulars of construction herein set forth are well suited to one mechanical form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. A filter unit comprising, in combination, a cell having inlet and outlet openings, a laminated cover for the inlet opening, and a laminated cover for the outlet opening comprising a plurality of tubular copper mesh fabric screens and an expanded metal sheet the edges of which are crimped over the screens.

2. A filter unit comprising a plurality of filtering media of different particle intercepting characteristics, one of said media including a plurality of layers of copper mesh fabric and another of said media including a deformed metal sheet having end portions extending across edge portions of said layers of copper mesh fabric to retain said layers in operative position.

3. A filter unit comprising a plurality of filtering media of different particle intercepting characteristics, one of said media including a plurality of layers of flexible copper mesh fabric and another of said media including a screen having end portions bent across edge portions of said layers of fabric to retain said layers in operative position.

In testimony whereof I have signed my name to this specification.

JAMES JARVIS PREBLE.